No. 822,651. PATENTED JUNE 5, 1906.
J. COAN.
TIRE ARMOR.
APPLICATION FILED JULY 31, 1905.
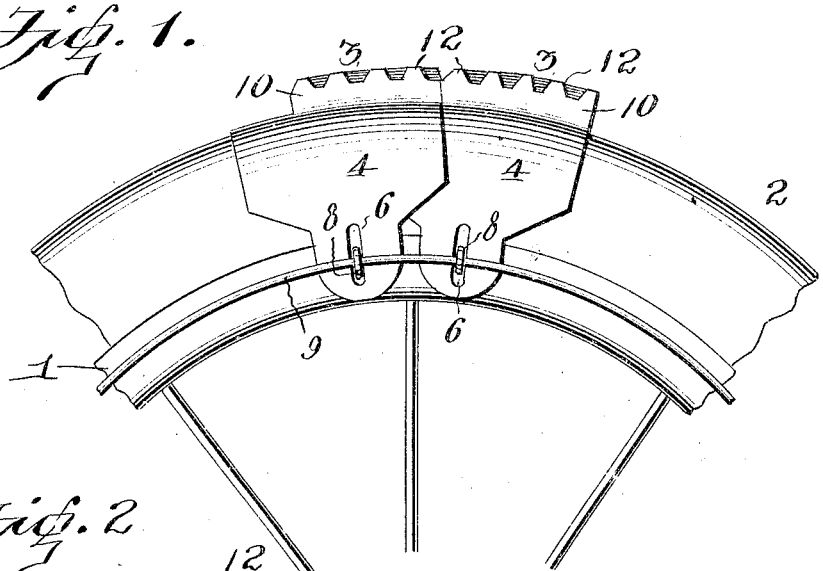
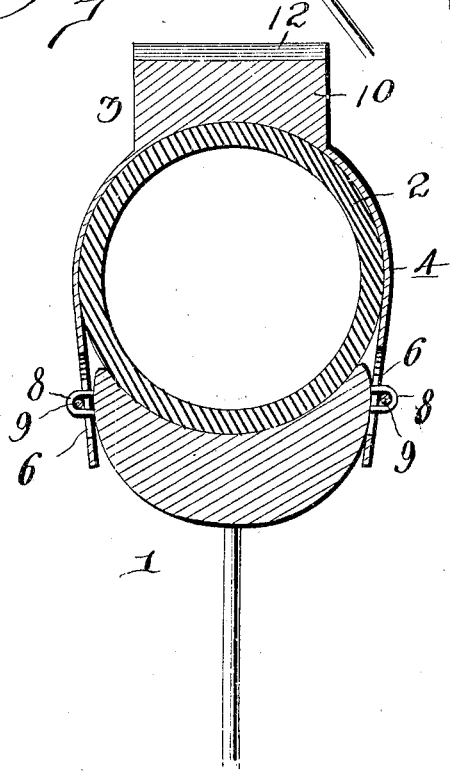
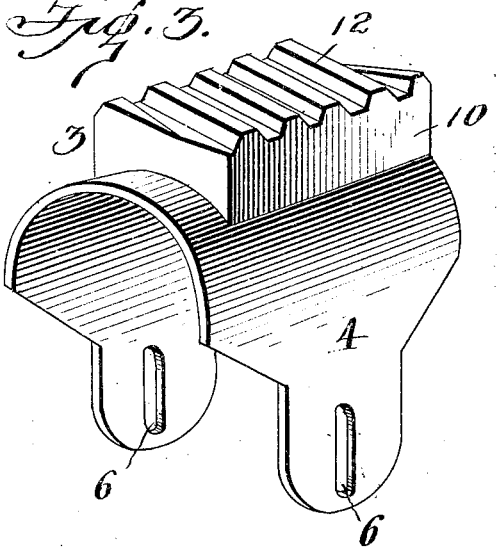
Witnesses
Jas. A. Kachl
C. W. Griesbauer
Inventor
John Coan.
by H. B. Willson.
Attorney

UNITED STATES PATENT OFFICE.

JOHN COAN, OF KANSAS CITY, MISSOURI, ASSIGNOR OF ONE-FIFTH TO ROY W. COAN, OF GRAVITY, IOWA.

TIRE-ARMOR.

No. 822,651.      Specification of Letters Patent.      Patented June 5, 1906.

Application filed July 31, 1905. Serial No. 272,603.

*To all whom it may concern:*

Be it known that I, JOHN COAN, a citizen of the United States, residing at Kansas City, in the county of Jackson and State of Missouri, have invented certain new and useful Improvements in Tire-Armors; and I do declare the following to be a full, clear, and exact description of the invention, such as will enable others skilled in the art to which it appertains to make and use the same.

This invention relates to improvements in protecting-armor for pneumatic and cushioned tires.

The object of the invention is to provide an armor of this character which will protect the tire against puncture and which will also prevent the wheels to which the same is applied from slipping, means being provided whereby the plates of the armor are attached to the rim of the wheel in such a manner that the resiliency of the tire will not be affected.

With the above and other objects in view the invention consists of certain novel features of construction, combination, and arrangement of parts, as will be hereinafter described and claimed.

In the accompanying drawings, Figure 1 is a side elevation of a portion of a wheel, showing the application of the invention thereto. Fig. 2 is a transverse sectional view through the rim and tire of the wheel and through the armor, and Fig. 3 is a detail perspective view of one of the armor-plates removed from the tire.

Referring more particularly to the drawings, 1 denotes the rim of a wheel, and 2 denotes the pneumatic tire on said rim. The armor 3 consists of a series of overlapping curved or segmental plates 4, which are adapted to fit around the tire of the wheel. On the ends of said plates are formed extensions in which are arranged vertically-disposed slots 6, said slots being adapted to engage eyes or loops 8, which are secured to and project laterally from the sides of the rim, as shown. After the slotted extension of the armor-plates have been engaged with said eyes or loops 8 a locking rod or wire 9 is inserted through the same, thereby preventing the disengagement of said plates from said eyes and slidably holding the same in place on the tire, so that the advantage of the resilient or yielding qualities of the tire will not be affected.

The tread-surface of the plates 4 is thickened or provided with tread-pieces 10, on the outer surface of which are formed a series of obliquely-disposed corrugations 12, whereby the wheel will be prevented from slipping upon smooth or wet surfaces or when going rapidly around a curve.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. An armor for tires of wheels, consisting of a series of independent overlapping sections, a tread-surface comprising obliquely-arranged corrugations arranged on each of said sections, and means whereby said sections are connected to the rim of the wheel to slide inwardly thereon, substantially as described.

2. An armor for the tires of wheels consisting of a series of independent overlapping segmental plates, slotted extensions formed on the ends of said plates, eyes or loops arranged on the rim of the wheels to engage the slots in said extensions, means to retain said slotted extensions of the armor-plates in engagement with said eyes or loops, and tread-surfaces arranged on the outer curved portion of said plates, substantially as described.

3. An armor for the tires of wheels consisting of a series of independent overlapping segmental plates, slotted extensions formed on the ends of said plates, eyes or loops arranged on the rim of the wheels to engage the slots in said extensions, a locking rod or wire adapted to be passed through said eyes or loops to retain said slotted extensions of the plates in place and thickened serrated tread-surfaces formed on said plates, substantially as described.

In testimony whereof I have hereunto set my hand in presence of two subscribing witnesses.

JOHN COAN.

Witnesses:
     J. T. WELLINGTON
     H. D. SIESS.